(No Model.) 2 Sheets—Sheet 1.

C. ALTRINGER.
FANNING MILL.

No. 357,261. Patented Feb. 8, 1887.

Witnesses:
E. G. Asmus
Maurice F. Frear

Inventor:
Christopher Altringer
By Stout & Underwood
Attorneys.

(No Model.) 2 Sheets—Sheet 2.

C. ALTRINGER.
FANNING MILL.

No. 357,261. Patented Feb. 8, 1887.

Witnesses:

Inventor:
Christopher Altringer
By Stout & Underwood
Attorneys.

UNITED STATES PATENT OFFICE.

CHRISTOPHER ALTRINGER, OF RACINE, WISCONSIN.

FANNING-MILL.

SPECIFICATION forming part of Letters Patent No. 357,261, dated February 8, 1887.

Application filed February 1, 1886. Serial No. 190,446. (No model.)

*To all whom it may concern:*

Be it known that I, CHRISTOPHER ALTRINGER, of Racine, in the county of Racine, and in the State of Wisconsin, have invented certain new and useful Improvements in Fanning-Mills; and I do hereby declare that the following is a full, clear, and exact description thereof.

My invention relates to fanning-mills; and it consists in certain peculiarities of construction, as will be fully set forth and claimed hereinafter.

Figure 1:
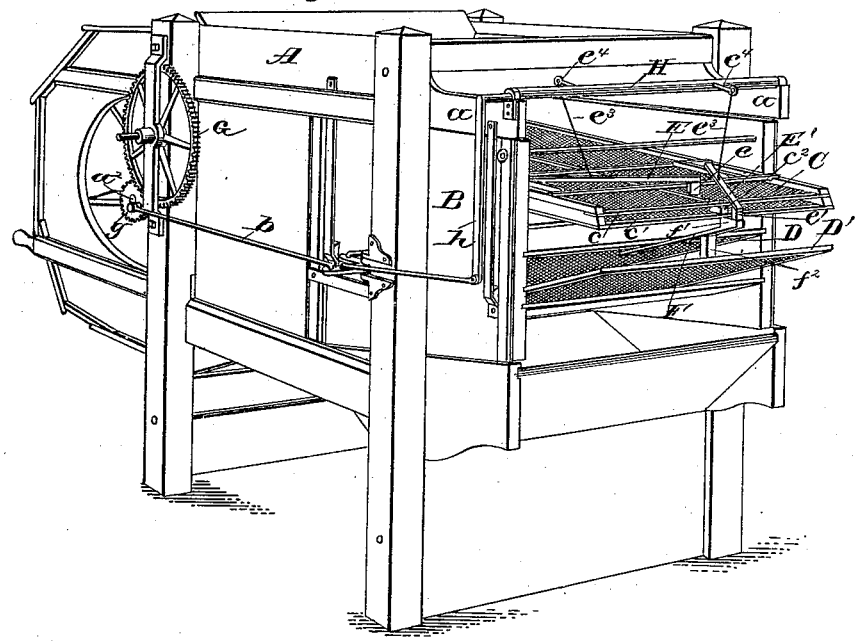
Figure 2:
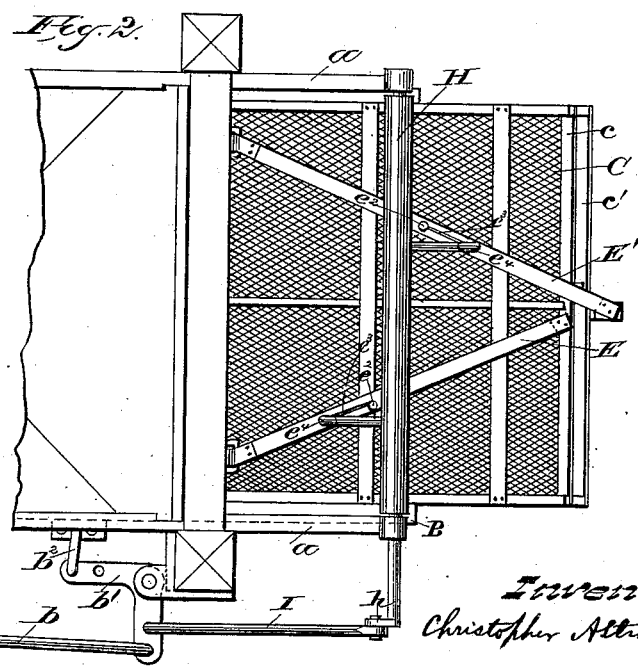
Figure 3:
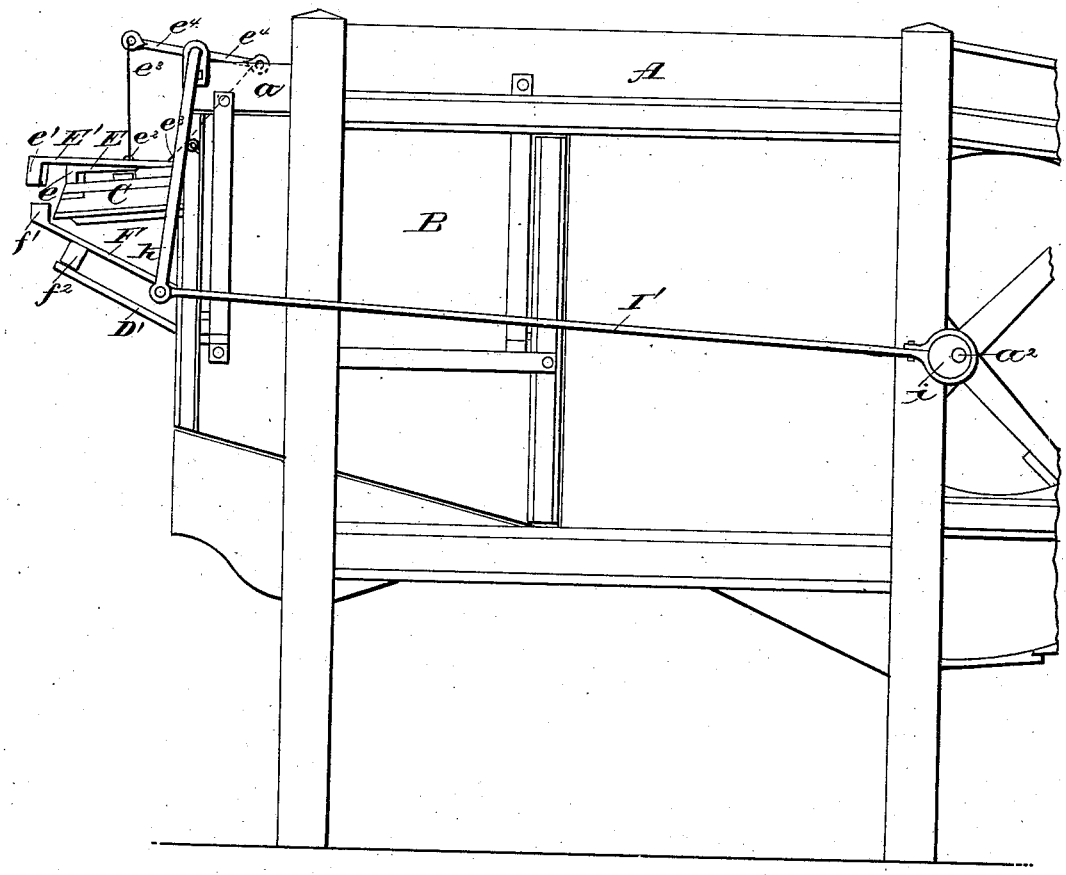

In the drawings, Figure 1 is a perspective view of a fanning-mill embodying one form of my present improvement. Fig. 2 is a plan view of part of a mill, showing the preferred form; and Fig. 3 is a side elevation embodying still another form of my present invention.

In the several forms shown I have represented chiefly an improvement on the machine patented to me and to Nicolaus Altringer and Nicolaus Altringer, Jr., on July 26, 1881, and numbered 244,727, illustrating, also, certain features of the fanning-mill patented to me May 7, 1872, and numbered 126,371, and also certain parts substantially similar to those shown in an application for patent executed on the same day as this present application, and filed February 1, 1886, Serial No. 190,445, and which last-named features are therefore not claimed in this present application, but in the other application and patents hereinbefore referred to.

A represents the fanning-mill frame and case. B is the shoe. C is a hurdle of sieves. D D' are screens below the hurdle. E E' are the pounding bars or levers, preferably fulcrumed independently of the shoe and its sieves and having weighted heads $e$ $e'$. F is a strip or frame adjustably attached to the screen D, and provided with a block, $f'$, on the upper side of its rear or free end, located just under the head $e'$ of the pounding bar E', and having another block, $f^2$, on its under side, a slight distance from its rear end and directly over the rear edge of the screen D'.

The hurdle C is composed of two sieves, $c$ and $c'$, united at their side edges and provided with a block, $c^2$, resting on the upper surface of the rear edge of the lower sieve, $c'$, and not quite touching the sieve $c$ above normally.

The main or fan shaft is shown at $a^2$ and the gears at G $g$, the shaking-rod at $b$, elbow-lever at $b'$, and shoe-hook at $b^2$, while $a$ $a$ represent upper rear extensions of the mill above the shoe B, all the foregoing being exactly as set forth and shown in detail in my accompanying application, above referred to. In my said application the pounding-bars are flexibly connected to a fixed part of the machine, as $a$ $a$, and operated directly by the vibrating (or laterally reciprocating) motion of the shoe B; but in my present application the pounding-bars are flexibly connected to a rock-shaft, H, having bearings in or upon a fixed portion of the mill, as $a$ $a$, and said rock-shaft having a crank-arm, $h$, connected with and deriving its motive power from the main shaft $a^2$, and hence the pounding-bars E and E' are raised by means of the reciprocations of the rock-shaft, instead of by the lateral movement of the shoe.

In Fig. 1 I show the pounding-bars secured to bearing-strips pivoted between the strengthening-bars on the upper side of the hurdle C, as in my other application heretofore referred to, and the same is true of the form shown in Fig. 3, although the attachment of the pounding-bars is not shown in the latter drawing, while in Fig. 2 I show the pounding-bars attached (by flexible bearings) to a fixed portion of the mill above the shoe; but in all these present forms the pounding-bars are flexibly connected to the rock-shaft H by means of cords, chains, or equivalent connections, $e^3$ $e^3$, extending from eyebolts $e^4 e^4$ on the rock-shaft to other eyebolts, $e^2$ $e^2$, on the pounding-bars, as shown.

In Figs. 1 and 2 the connection between the crank-arm $h$ of the rock-shaft H and the main shaft $a^2$ is made by utilizing the shaking-rod $b$ and elbow-lever $b'$ by simply attaching a link, I, to said elbow $b'$ and said crank-arm $h$, while in Fig. 3 I make the desired connection on the other side of the machine by means of a pitman-rod, I', and eccentric $i$. In this latter case, of course, I have the crank-arm $h$ on the opposite end of the rock-shaft H from that shown in the other figures, and the eccentric $i$ takes the place of the elbow-lever $b'$ in securing the desired intermittent motion, which causes the pounding-bars E and E' to be raised only at stated intervals. I extend the eyebolts $e^4$ $e^4$ from opposite sides of the rock-shaft and in opposite directions, in order to insure that the pounding-bars shall be raised and permitted to fall alternately. Of course, if I wish them both to fall (or be raised) at the same time, I have only to extend the eyebolts from the same side of the rock-shaft equally; but I prefer in most cases the alternate plan, as shown and described.

In this, as in my other application of even date herewith, the head $e$ of the pounding-bar E is designed to fall upon the upper rear edge of the upper sieve, $c$, of the hurdle C, and thereby to depress the same upon the block $c^2$, secured to the sieve $c'$ of the hurdle, thereby vibrating the said lower sieve, $c'$, also, while the head $e'$ of the bar E' is designed to fall on the block $f'$ (or, if no block $f'$ is used, on the end of the bar F) and transmit the force of the blow to screen D, and by reason of the block $f^2$ to the screen D', thereby vibrating both screens, all as in my said other application.

Having thus described my invention, what I claim as new, and desire to secure by Letters Patent, is—

1. The combination of the frame, a vibrating shoe carrying sieves, a rock-shaft, pounding-levers flexibly connected thereto and fulcrumed independently of the shoe and its sieves, the main or fan shaft, and a crank-arm on the rock-shaft connected with and deriving its motion from the main shaft, substantially as set forth.

2. The combination of the frame, a main or fan shaft, a rock-shaft having a crank-arm connected with the fan-shaft, and a vibrating shoe carrying sieves, with pounding bars or levers fulcrumed above the upper sieve, and flexible connections between the rock-shaft and pounding-bars, substantially as set forth.

3. The combination of the frame, a main or fan shaft, a rock-shaft having a crank-arm connected with the fan-shaft, and oppositely-projecting eyebolts, a vibrating shoe carrying sieves, a pair of pounding-levers fulcrumed above the upper sieve, and flexible connections between the said levers and eyebolts, substantially as set forth.

In testimony that I claim the foregoing I have hereunto set my hand, at Milwaukee, in the county of Milwaukee and State of Wisconsin, in the presence of two witnesses.

CHRISTOPHER ALTRINGER.

Witnesses:
H. G. UNDERWOOD,
MAURICE F. FREAR.